(12) United States Patent
Yang

(10) Patent No.: US 12,010,636 B2
(45) Date of Patent: Jun. 11, 2024

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 18 days.

(21) Appl. No.: 17/563,007

(22) Filed: Dec. 27, 2021

(65) Prior Publication Data

US 2022/0124645 A1 Apr. 21, 2022

Related U.S. Application Data

(63) Continuation of application No. PCT/CN2019/099268, filed on Aug. 5, 2019.

(51) Int. Cl.
*H04W 56/00* (2009.01)

(52) U.S. Cl.
CPC .................. *H04W 56/00* (2013.01)

(58) Field of Classification Search
CPC ............ H04W 74/0833; H04W 56/00; H04W 56/0045; H04B 7/1851; H04B 7/18563
See application file for complete search history.

(56) References Cited

U.S. PATENT DOCUMENTS

| | | | |
|---|---|---|---|
| 2019/0075605 A1* | 3/2019 | Bae | H04W 74/0833 |
| 2020/0313754 A1* | 10/2020 | Wang | H04W 72/121 |
| 2022/0124645 A1* | 4/2022 | Yang | H04W 56/0045 |
| 2022/0272760 A1* | 8/2022 | Murray | H04W 74/0833 |

FOREIGN PATENT DOCUMENTS

| | | | | |
|---|---|---|---|---|
| AU | 2018289195 | | 3/2019 | |
| CN | 103037498 | | 4/2013 | |
| CN | 104662971 | | 5/2015 | |
| CN | 105848278 | | 8/2016 | |
| CN | 103313250 | | 9/2016 | |
| CN | 111867041 A | * | 10/2020 | ........ H04W 56/0045 |
| CN | 111867073 A | * | 10/2020 | |
| CN | 111565470 B | * | 3/2023 | ............ H04W 52/36 |
| EP | 2408243 | | 1/2012 | |
| JP | 6405476 B2 | * | 10/2018 | .............. H04J 11/00 |
| WO | WO 2018/031110 | * | 2/2018 | ............ H04W 80/04 |
| WO | 2018063068 | | 4/2018 | |

(Continued)

OTHER PUBLICATIONS

EPO, Extended European Search Report for EP Application No. 19940645.5, dated May 23, 2022.

(Continued)

*Primary Examiner* — Phong La
(74) *Attorney, Agent, or Firm* — Hodgson Russ LLP

(57) ABSTRACT

A wireless communication method, a terminal device, and a network device are provided in implementations of the present disclosure. The wireless communication method includes the following. The terminal device receives first information transmitted by the network device, where the first information is used for the TA adjustment.

20 Claims, 5 Drawing Sheets

(56) References Cited

FOREIGN PATENT DOCUMENTS

WO     WO-2018082668 A1 *   5/2018         H04W 56/0015
WO           2019038294         2/2019
WO     WO-2020200393 A1 * 10/2020          H04B 7/18504

OTHER PUBLICATIONS

"3rd Generation Partnership Project; Technical Specification Group Radio Access Network; NR; Physical channels and modulation (Release 16)," 3GPP TS 38.211, Sep. 2021, v16.7.0.
WIPO, International Search Report for PCT/CN2019/099268, dated Apr. 26, 2020.
CNIPA, First Office Action for CN Application No. 201980093426.7, dated Jun. 10, 2023.
CNIPA, Second Office Action for CN Application No. 201980093426.7, Jan. 24, 2024.

* cited by examiner

WIRELESS COMMUNICATION METHOD, TERMINAL DEVICE, AND NETWORK DEVICE

CROSS REFERENCE TO RELATED APPLICATION(S)

This application is a continuation of International Application No. PCT/CN2019/099268, filed on Aug. 5, 2019, the entire disclosure of which is incorporated herein by reference.

TECHNICAL FIELD

Implementations of the present disclosure relate to the field of communication, and more particularly, to a wireless communication method, a terminal device, and a network device.

BACKGROUND

A fifth-generation new radio (5G NR) system defines deployment scenarios of non-terrestrial networks (NTN) including satellite networks. With wide-area coverage capabilities of satellites, an NTN system can realize continuity of 5G NR services. Due to fast movement of satellites relative to the ground, the NTN system has higher requirements for uplink synchronization. How to achieve uplink synchronization in the NTN system is an open problem.

SUMMARY

In a first aspect, a wireless communication method is provided. The method includes the following.

A terminal device receives first information transmitted by a network device, where the first information is used for a TA adjustment.

In a second aspect, a wireless communication method is provided. The method includes the following.

A network device transmits first information to a terminal device, where the first information is used for a TA adjustment.

In a third aspect, a terminal device is provided. The terminal device includes a processor, a transceiver, and a memory configured to store computer programs.

The processor is configured to invoke and execute the computer programs stored in the memory to cause the transceiver to receive first information transmitted by a network device, where the first information is used for a TA adjustment.

In a fourth aspect, a network device is provided. The network device includes processor, a transceiver, and a memory configured to store computer programs.

The processor is configured to invoke and execute the computer programs stored in the memory to cause the transceiver to transmit first information to a terminal device, where the first information is used for a TA adjustment.

DETAILED DESCRIPTION

The following will describe technical solutions of implementations of the present disclosure with reference to the accompanying drawings. Apparently, implementations described herein are merely some implementations, rather than all implementations, of the disclosure. For the implementations described herein, all other implementations obtained by those of ordinary skill in the art without creative effort shall fall within the protection scope of the disclosure.

The technical solutions of implementations of the present disclosure are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a wireless local area networks (WLAN), a wireless fidelity (WiFi), a next-generation communication system, or other communication systems.

Generally speaking, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication. Implementations of the present disclosure can also be applied to these communication systems.

Optionally, a communication system of implementations of the present disclosure may be applied to a carrier aggregation (CA) scenario, a dual connectivity (DC) scenario, or a standalone (SA) network deployment scenario.

There is no limitation on the type of frequency spectrum in implementations of the present disclosure. For example, implementations of the present disclosure are applicable to a licensed frequency spectrum, and also applicable to an unlicensed frequency spectrum.

Figure 1:
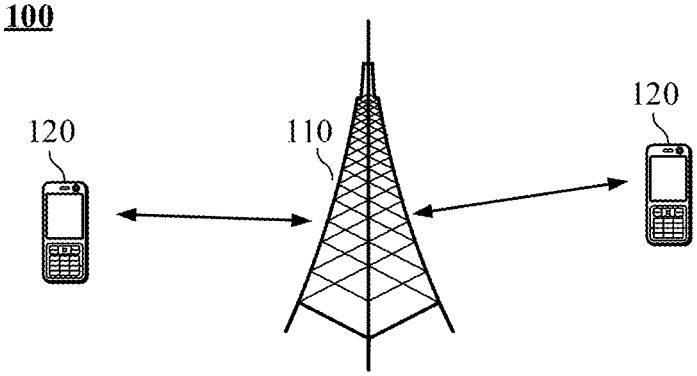
FIG. 1 is a schematic diagram of a communication system architecture provided in an implementation of the present disclosure.

Exemplarily, as illustrated in FIG. 1, a communication system 100 may include a network device 110. The network device 110 may be a device that can communicate with a terminal device 120 (also referred to as "communication terminal" or "terminal"). The network device 110 can provide a communication coverage for a specific geographical area and communicate with terminal devices in the coverage area.

FIG. 1 exemplarily illustrates one network device and two terminal devices. The communication system 100 may also include multiple network devices, and there can be other numbers of terminal devices in a coverage area of each of the network devices, which is not limited herein.

Optionally, the communication system 100 may further include other network entities such as a network controller, a mobile management entity, or the like, and the disclosure is not limited in this regard.

It should be understood that, in implementations of the present disclosure, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, and the disclosure is not limited in this regard.

It should be understood that, the terms "system" and "network" herein are usually interchangeable. The term "and/or" herein describes only an association relationship for describing associated objects and represents that three relationships may exist. For example, A and/or B may represent the following three cases: only A exists, both A and B exist, and only B exists. In addition, the character "/" herein generally indicates an "or" relationship between the associated objects.

Implementations of the present disclosure have been described in connection with the terminal device and the network device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device. The terminal device may be a station (ST) in a WLAN, a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, and a next-generation communication system, for example, a terminal device in an NR network, a terminal device in a future evolved public land mobile network (PLMN), etc.

By way of explanation rather than limitation, according to implementations of the present disclosure, the terminal device may also be a wearable device. The wearable device may also be called a wearable smart device, which is a generic term of wearable devices obtained through intelligentization designing and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

The network device may be a device configured to communicate with a mobile device, and the network device may be an access point (AP) in the WLAN, a base transceiver station (BTS) in the GSM or CDMA, may also be a Node B (NB) in WCDMA, and may further be an evolutional Node B (eNB or eNodeB) in LTE, or a relay station or AP, or an in-vehicle device, a wearable device, a network device or a g-Node B (gNB) in the NR network, a network device in the future evolved PLMN, or the like.

In implementations of the present disclosure, the network device provides services for a cell, and the terminal device communicates with the network device through a transmission resource (for example, a frequency domain resource or a spectrum resource) for the cell. The cell may be a cell corresponding to the network device (for example, a base station). The cell may correspond to a macro base station, and may correspond to a base station corresponding to a small cell. The small cell may include: a metro cell, a micro cell, a pico cell, a femto cell, and the like. These small cells are characterized by small coverage and low transmission power and are adapted to provide data transmission service with high-rate.

It should be understood that, in an uplink synchronization mechanism of the NR system, a timing advance (TA) needs to be acquired first, and then uplink synchronization is performed based on the TA.

Specifically, there are different ways for a terminal device in an idle state and in a connected state to acquire the TA. In the idle state or in an inactive state, the terminal device does not maintain time synchronization with network side. Therefore, the terminal device needs to perform random access, acquires the TA and performs uplink synchronization and calibration during initial access. In the connected state, the terminal device obtains the TA according to a timing advance command (TAC) transmitted by a network device and performs synchronization and calibration.

Based on the TAC or random access, an uplink frame transmission advance is $(N_{TA}+N_{TAoffset}) \times T_c$, where $N_{TA}$ is related to the TAC or a TAC carried in a random access response (RAR). An index of a TA adjustment is given in the TAC. In a case where the TAC is carried in the RAR, $N_{TA}=T_A \cdot 16 \cdot 64/2^\mu$, where $T_A$=TAC and has a value of 0, 1, 2, ..., or 3846. In a case where the TAC is carried in a dedicated media access control-control element (MAC CE), $N_{TA\_new}=N_{TA\_old}+(T_A-31) \cdot 16 \cdot 64/2^\mu$, where $T_A$=TAC and has a value of 0, 1, 2, ..., or 63. In addition, $T_c$ is the minimum time unit in physical layer, and $T_c=1/(\Delta f_{max} \cdot N_f)$, $\Delta f_{max}=480 \cdot 10^3$ Hz, $N_f=4096$. $N_{TAoffset}$ has a value illustrated in Table 1.

TABLE 1

The value of $N_{TAoffset}$

| Frequency range and band of cell used for uplink transmission | $N_{TAoffset}$ |
|---|---|
| FR1 FDD band without LTE-NR coexistence case or FR1 TDD band without LTE-NR coexistence case | 25600 |
| FR1 FDD band with LTE-NR coexistence case | 0 |
| FR1 TDD band with LTE-NR coexistence case | 39936 |
| FR2 | 13792 |

Figure 2:
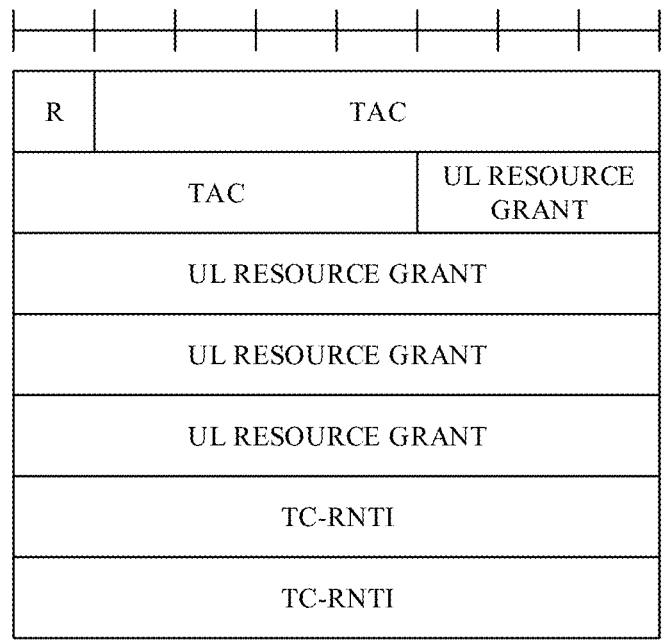
FIG. 2 is a schematic diagram of a random access response (RAR) carrying a timing advance command (TAC) provided in an implementation of the present disclosure.
Figure 3:
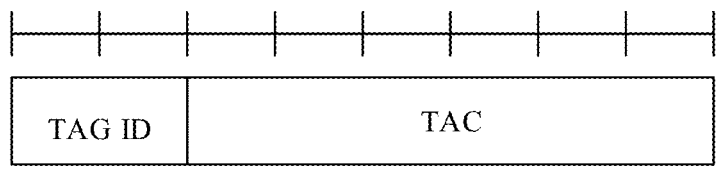
FIG. 3 is a schematic diagram of a TAC media access control-control element (MAC CE) provided in an implementation of the present disclosure.

It should be noted that, a current RAR format may be as illustrated in FIG. 2, that is, the TAC is carried in an RAR. The terminal device determines an initial TA value according to a TA received. Of course, the RAR illustrated in FIG. 2 may also carry some other information, such as uplink (UL) resource grant and a temporary cell radio network temporary identity (TC-RNTI). A current TAC MAC CE may be as illustrated in FIG. 3, that is, the TAC is carried in a MAC CE, and the TAC MAC CE also carries a timing advance group (TAG) identifier (ID) corresponding to the TAC. The terminal device determines an updated TA value according to the TA received.

In addition, the network device configures a timing adjustment timer (i.e., timeAlignmentTimer) for each TAG. This configuration information indicates how long a MAC entity considers that a serving cell belonging to this TAG is uplink time-synchronized. Upon reception of the TA, the terminal device starts the timing adjustment timer to maintain uplink synchronization. When the timing adjustment timer expires, corresponding operations such as reserving $N_{TA}$ and emptying a hybrid automatic repeat request (HARQ) buffer are performed.

A fifth-generation new radio (5G NR) system defines deployment scenarios of non-terrestrial networks (NTN) including satellite networks. An NTN system generally provides communication services to terrestrial users through satellite communication. Compared with terrestrial cellular network communication, the satellite communication has many unique advantages. First, the satellite communication is not constrained by areas of the users. For example, terrestrial communication is not able to cover sparsely populated areas as well as areas where communication devices cannot be set up, such as oceans, mountains, and deserts. In contrast, for the satellite communication, one satellite can cover a large area, and the satellite can orbit the earth, therefore, in theory, every corner on the earth can be covered for satellite communication. Second, the satellite communication has greater social value. Remote mountainous areas, poor and backward countries or regions can be covered for satellite communication at a low cost, so that people in these areas can enjoy advanced voice communication and mobile interne technologies, thereby narrowing a digital gap with developed areas and promoting the development of these areas. Third, a satellite has a long communication distance, and a communication cost thereof does not increase greatly with the increase of the communication distance. Finally, the satellite communication has high stability and is not constrained by natural disasters.

Communication satellites are classified into low-earth orbit (LEO) satellites, medium-earth orbit (MEO) satellites, geostationary earth orbit (GEO) satellites, high elliptical orbit (HEO) satellites, and the like according to different orbital altitudes.

For example, for the LEO satellite, the orbital altitude thereof is in the range of 500 km to 1500 km, a corresponding orbital period is about 1.5 hours to 2 hours, and signal propagation delay of single-hop communication between users is generally less than 20 ms. A satellite has a maximum visibility time of 20 minutes, a short signal propagation distance, and a less link loss is small, and does not have high transmission power requirements for a user terminal.

For another example, for the GEO satellite, the orbital altitude thereof is 35786 km, a rotation period around the earth thereof is 24 hours, and signal propagation delay of single-hop communication between users is generally 250 ms.

It should be noted that, compared with a cellular network adopted in traditional NR, in NTN, a signal propagation delay between a terminal device and a satellite is greatly increased. In some scenarios, such as LEO, there is also a problem of fast movement of the satellite relative to the ground. If an uplink synchronization mechanism for a current terrestrial NR system is directly used in the NTN system, there will be the following two problems.

1. Due to fast movement of the satellite relative to the ground, in order to ensure uplink synchronization between the terminal device and the satellite, a network needs to continuously transmit TAC, which will bring a lot of air interface signaling overhead.

2. Due to a large propagation delay, even if a TA is adjusted through frequent TACs, the terminal device can only adjust the TA long after TAC transmission of the network, which leads to an excessive delay in network signaling-based TA adjustment and even inapplicability of a TA adjustment amount, thereby seriously affecting user experience.

In view of the above technical problems, it is necessary to study an uplink synchronization enhancement scheme in NTN. On the one hand, signaling overhead of frequent TAC indications and inapplicability of the TA adjustment amount need to be reduced. On the other hand, synchronization between the terminal device and the network needs to be ensured, to ensure data transmission performance.

The following describes in detail an uplink synchronization scheme designed in the present disclosure for the above technical problems.

Figure 4:
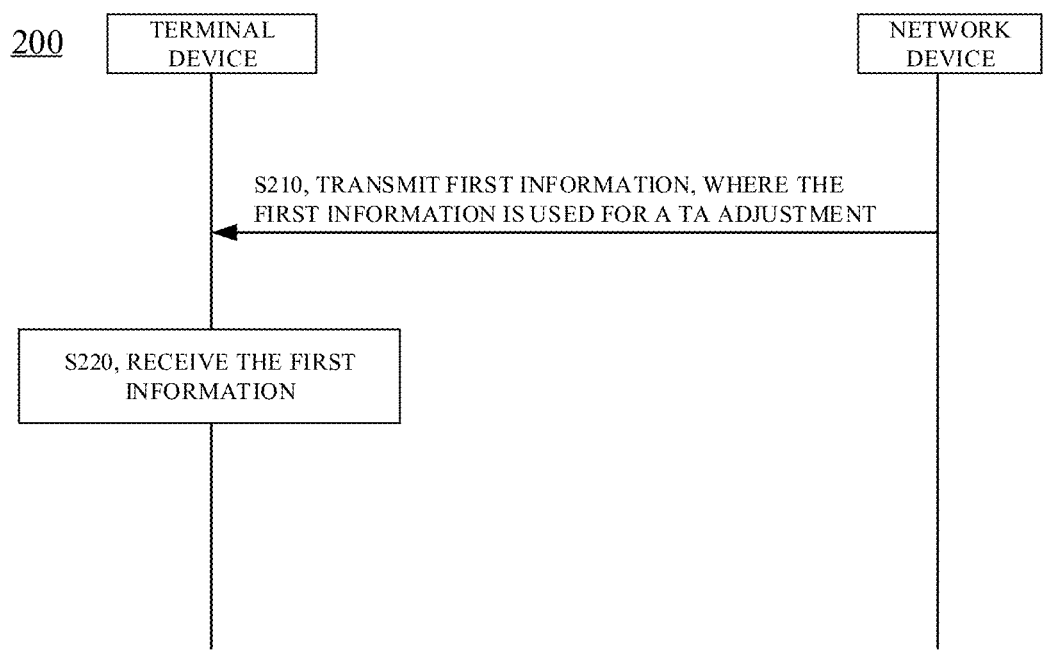
FIG. 4 is a schematic flowchart of a wireless communication method provided according to an implementation of the present disclosure.

FIG. 4 is a schematic flowchart of a wireless communication method 200 according to an implementation of the present disclosure. As illustrated in FIG. 4, the method 200 may include some or all of the following operations.

S210, a network device transmits first information to a terminal device, where the first information is used for a TA adjustment.

S220, the terminal device receives the first information transmitted by the network device.

Optionally, the method 200 is applicable to NTN. That is, implementations of the present disclosure are applicable to NTN.

Optionally, implementations of the present disclosure are also applicable to a system other than NTN, for example, a V2V system, a D2D system, an LTE system, an NR system, and a future evolved communication system.

Optionally, the first information may also be used to assist the terminal device in adjusting uplink synchronization. Assisting the terminal device in adjusting uplink synchronization can be understood as: after the TA adjustment based on the first information, the terminal device performs uplink synchronization based on an adjusted TA.

Optionally, in implementations of the present disclosure, the network device may transmit the first information to the terminal device through broadcast or a dedicated radio resource control (RRC) signaling.

It should be noted that, in an existing uplink synchronization mechanism, the network device indicates a TA, and the terminal device adjusts uplink synchronization based on the TA indicated by the network device. However, in implementations of the present disclosure, the network device indicates the first information used for the TA adjustment, and the terminal device adaptively perform the TA adjustment according to the first information, and adjusts uplink synchronization based on an adjusted TA. That is, the terminal device can perform the TA adjustment actively and adaptively based on the first information. In this way, overhead caused by frequent TAC indications by the network device and inapplicability of a TA adjustment amount (that is, when the terminal device receives a TAC, a TA indicated in the TAC may be inaccurate due to delay) can be avoided, thereby ensuring synchronization between the terminal device and the network device. In other words, between receptions of TA adjustment commands indicated by the network device, for example, between one TAC and a next TAC, the terminal device can adjust the TA adaptively.

Optionally, in implementations of the present disclosure, after receiving the first information, the terminal device may store the first information. After receiving a TA indicated by the network device through a TAC MAC CE, or after receiving a TA indicated by the network device through an RAR, the terminal device adjusts the TA adaptively according to the first information.

Optionally, the terminal device receives second information transmitted by the network device, where a second TA is indicated in the second information, and the terminal device adjusts uplink synchronization according to the second TA.

For example, the second information is information or a downlink shared channel (DL-SCH) carrying a TAC MAC CE, or the second information is an RAR.

Optionally, the terminal device performs the TA adjustment according to the first information and a first TA within a duration of a first timer.

Optionally, the first TA is one of: a TA indicated in a TAC MAC CE, a TA indicated in a RAR, and a TA obtained through last adjustment.

It should be understood that, in a first TA adjustment within the duration of the first timer, the first TA may be the TA indicated in the TAC MAC CE, or the TA indicated in the RAR, but cannot be the TA obtained through last adjustment.

For example, the first timer is started when the second information is received, or the first timer is started when adjustment of the uplink synchronization according to the second TA is completed.

It should be noted that, the first timer is started when the second information is received, or the first timer is started when adjustment of the uplink synchronization according to the second TA is completed, in either case, first uplink synchronization within the duration of the first timer can be performed in one of the following two manners.

In manner 1, the terminal device adjusts uplink synchronization according to the second TA. In manner 2, the terminal device performs the TA adjustment according to the first information and the first TA and adjusts uplink synchronization according to an adjusted TA.

Optionally, the terminal device receives third information transmitted by the network device within the duration of the first timer, where a third TA is indicated in the third information. The terminal device adjusts uplink synchronization according to the third TA. For example, the third information is information or a DL-SCH carrying a TAC MAC CE, or the third information is an RAR. That is, within the duration of the first timer, the terminal device receives a TA newly indicated by the network device, and adjusts an uplink timing advance according to the TA newly received. Specifically, after receiving the third TA, behaviors of the UE may be the same as after receiving the second information. For example, the first timer is started when the third information is received, or the first timer is started when adjustment of the uplink synchronization according to the third TA is completed.

Correspondingly, the network device transmits the third information to the terminal device within the duration of the first timer, where the third TA is indicated in the third information, and the third TA is used for the terminal device to adjust the uplink synchronization.

It should be noted that, the third information is usually information or a DL-SCH carrying a TAC MAC CE. However, during triggering random access, the third information may also be an RAR.

Optionally, the first timer may be stopped or reset when or after the third information is received.

It should be noted that, in a case where the first timer expires, the terminal device can perform the TA adjustment adaptively according to the first information. In a case where the first timer expires, the terminal device can monitor a next TA indication of the network device. After the next TA indication is monitored, the terminal device starts the first timer again and performs the TA adjustment again according to the first information. Optionally, the first timer may be pre-configured or configured by the network device.

For example, the network device transmits second configuration information to the terminal device, where the second configuration information is used to configure the first timer. The terminal device is configured to perform the TA adjustment according to the first information and the first TA within the duration of the first timer.

Optionally, in implementations of the present disclosure, terminal device capability reporting mechanism may also be introduced, for example, the terminal device reports whether it has a TA adjustment capability. This prevents a terminal device that does not have the TA adjustment capability from being unable to use the first information, or prevents the network device from transmitting the first information to a terminal device that does not have the TA adjustment capability.

For example, the terminal device transmits first indication information to the network device, where the first indication information indicates that the terminal device has the TA adjustment capability.

For another example, the terminal device receives first request information transmitted by the network device, where the first request information is used to request the terminal device to report whether it has the TA adjustment capability. The terminal device transmits the first indication information to the network device, where the first indication information indicates that the terminal device has the TA adjustment capability.

Optionally, the network device may transmit the first information to a terminal device that has the TA adjustment capability through a dedicated RRC signaling.

Optionally, the network device transmits the first information through broadcast or a dedicated RRC signaling. If the terminal device does not have the TA adjustment capability, the terminal device ignores or skips the first information. If the terminal device has the TA adjustment capability, the terminal device performs the TA adjustment according to the first information.

Optionally, in Implementation 1, the first information includes at least one of: a TA adjustment step size (delta), a TA adjustment time interval (or referred to as a TA adjustment duration), a TA adjustment time point, a TA adjustment trigger condition, and indication information for enabling an auxiliary uplink TA adjustment function.

Optionally, in Implementation 1, the terminal device performs the TA adjustment according to the first information and a first TA. Alternatively, the terminal device performs the TA adjustment according to the first information and the first TA within a duration of a first timer.

Optionally, the terminal device calculates an adaptive accumulated TA adjustment amount within the duration of the first timer. For example, the terminal device calculates the accumulated TA adjustment amount according to the first information. At each TA adjustment, the terminal device performs the TA adjustment based on the accumulated adjustment amount.

Optionally, in Implementation 1, the terminal device may perform the TA adjustment according to the first information and the first TA as follows.

If the first TA is the TA indicated in the TAC MAC CE or the TA indicated in the RAR, and the TA adjustment is a first TA adjustment, an adjusted TA is equal to a sum of the first TA and the TA adjustment step size.

Alternatively, if the first TA is the TA indicated in the TAC MAC CE or the TA indicated in the RAR, and the TA adjustment is an i-th TA adjustment, the adjusted TA is equal to a sum of the first TA and i TA adjustment values, i being a positive integer and i>1.

Alternatively, if the first TA is a TA obtained through an (i−1)-th adjustment, and the TA adjustment is the i-th TA adjustment, the adjusted TA is equal to a sum of the first TA and the TA adjustment step size, i being a positive integer and i>2.

For example, the first information includes: a TA adjustment step size, a TA adjustment time interval, and a TA adjustment trigger condition, where the TA adjustment step size is delta M, the TA adjustment time interval is 1 minute, and the TA adjustment trigger condition is that a difference between two measured reference signal receiving powers (RSRP) is greater than a threshold N. Assuming that a TA indicated in a TAC is TA K, if at a moment t1, the TA adjustment trigger condition is met, that is, the difference between the two measured RSRPs is greater than the threshold N, the UE will automatically adjust an uplink TA after a first duration subsequent to the moment t1 (the first duration>=0), and an adjusted TA=TA K (a current TA) indicated in the TAC+delta M. At TA adjustment time interval, or at TA adjustment time interval and on condition that the TA adjustment condition is met, the UE performs the TA adjustment again, and the adjusted TA=a TA obtained through last adjustment+delta M, i.e., the adjusted TA=TA K indicated in the TAC+an accumulated TA adjustment amount, for example, when the TA adjustment is a second TA adjustment, the accumulated TA adjustment amount=delta M+delta M.

For another example, the first information includes: the TA adjustment step size and the TA adjustment time interval, where the TA adjustment step size is delta M, and the TA adjustment time interval is 1 minute. Assuming that the TA indicated in the TAC is K, and the TAC indicating the current TA is received at a moment t1, the UE will automatically adjust the uplink TA after the first duration subsequent to the moment t1 (the first duration>=0), and the adjusted TA=TA K indicated in the TAC+delta M. At TA adjustment time interval, the UE performs the TA adjustment again, and the adjusted TA=the TA obtained through last adjustment+delta M, i.e., the adjusted TA=TA K indicated in the TAC+the accumulated TA adjustment amount, for example, when the TA adjustment is the second TA Adjustment, the accumulated TA adjustment amount=delta M+delta M.

Figure 5:
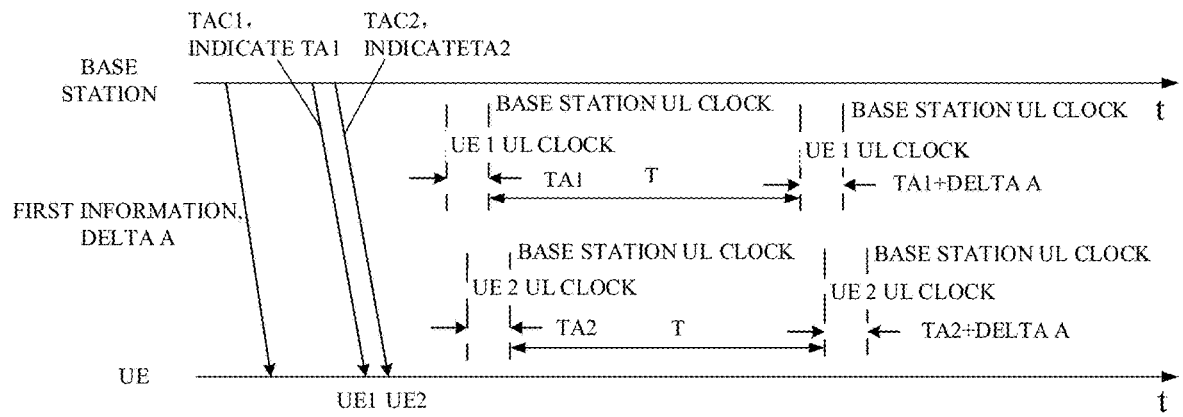
FIG. 5 is a schematic flowchart of uplink synchronization provided according to an implementation of the present disclosure.

Specifically, in Implementation 1, as illustrated in FIG. 5, assume that a base station indicates first information to UE 1 and UE 2 through broadcast or a dedicated RRC signaling, and the first information includes a TA adjustment step size delta A and a TA adjustment time interval T. UE 1 and UE 2 store the first information. The base station transmits TAC 1 for UE 1, where TAC 1 indicates TA 1, and transmits TAC 2 for UE 2, where TAC 2 indicates TA 2. UE 1 adjusts uplink synchronization with the base station based on TA 1, that is, UE 1 transmits uplink information according to a timing advance of TA 1. UE 2 adjusts uplink synchronization with the base station based on TA 2, that is, UE 2 transmits uplink information according to a timing advance of TA 2. After UE 1 adjusts the uplink synchronization with the base station based on TA 1, UE 1 automatically adjusts an uplink TA after a duration T, and an adjusted TA=TA 1 +delta A. UE 1 transmits uplink information according to a timing advance=TA 1+delta A. After UE 2 adjusts the uplink synchronization with the base station based on TA 2, UE 2 automatically adjusts an uplink TA after a duration T, an adjusted TA=TA 2+delta A. UE 2 transmits uplink information according to a timing advance=TA 2+delta A. Subsequently, UE 1 and UE 2 perform the TA adjustment again at time interval T.

Optionally, in Implementation 2, the first information includes at least one of: at least one TA adjustment step size, at least one TA adjustment time interval, at least one TA adjustment time point, at least one TA adjustment trigger condition, at least one group identifier, and at least one indication information for enabling an auxiliary uplink TA adjustment function.

Optionally, at least part of the first information satisfies a one-to-one correspondence. For example, the at least one group identifier is in one-to-one correspondence with the at least one TA adjustment step size. For another example, one TA adjustment step size corresponds to one TA adjustment time interval, one TA adjustment time point, and one TA adjustment trigger condition.

Optionally, at least part of the first information satisfies a one-to-many correspondence. For example, multiple TA adjustment steps correspond to one TA adjustment time interval. For another example, multiple group identifiers correspond to one TA adjustment time interval, one TA adjustment time point, and one TA adjustment trigger condition.

Optionally, at least one of the following, which is used by terminal groups with different group identifiers in the first information, has different values: a TA adjustment step size, a TA adjustment time interval, a TA adjustment time point, a TA adjustment trigger condition, and indication information for enabling an auxiliary uplink TA adjustment function.

For example, in the first information, the TA adjustment step size used by terminal group 1 has a different value from the TA adjustment step size used by terminal group 2, and other information used by terminal group 1 has a same value as other information used by terminal group 2.

For another example, in the first information, the TA adjustment step size used by terminal group 1 has a different value from the TA adjustment step size used by terminal group 2, the TA adjustment time interval used by terminal group 1 has a different value from the TA adjustment time interval used by terminal group 2, and other information used by terminal group 1 has a same value as other information used by terminal group 2.

Optionally, in Implementation 2, the terminal device stores the correspondence between at least parts of the first information. For example, the terminal device stores TA adjustment information corresponding to a group identifier corresponding to the terminal device, such as, group X corresponding to the terminal device and a TA adjustment step size corresponding to group X.

Optionally, in Implementation 2, the terminal device determines first TA adjustment information in the first information according to group information or a group identifier corresponding to the terminal device, where the first TA adjustment information includes at least one of: a first TA adjustment step size, a first TA adjustment time interval, a first TA adjustment time point, a first TA adjustment trigger condition, and first indication information for enabling an auxiliary uplink TA adjustment function.

For example, if UE 1 belongs to group 1, then UE 1 has a TA adjustment step size X, a TA adjustment time interval Y, and a TA adjustment time point Z, if UE 2 belongs to group 2, then UE 2 has a TA adjustment step size M and a TA adjustment time interval N.

Optionally, in Implementation 2, the terminal device performs the TA adjustment according to the first TA adjustment information and a first TA. Alternatively, the terminal device performs the TA adjustment according to the first TA adjustment information and the first TA within a duration of a first timer.

Optionally, the terminal device calculates an adaptive accumulated TA adjustment amount within the duration of the first timer. For example, the terminal device calculates the accumulated TA adjustment amount according to the first information. At each TA adjustment, the terminal device performs the TA adjustment based on the accumulated adjustment amount.

Optionally, in Implementation 2, the terminal device may perform the TA adjustment according to the first TA adjustment information and the first TA as follows.

If the first TA is the TA indicated in the TAC MAC CE or the TA indicated in the RAR, and the TA adjustment is a first TA adjustment, an adjusted TA is equal to a sum of the first TA and the first TA adjustment step size.

Alternatively, if the first TA is the TA indicated in the TAC MAC CE or the TA indicated in the RAR, and the TA adjustment is an i-th TA adjustment, the adjusted TA is equal to a sum of the first TA and i TA adjustment values, i being a positive integer and i>1.

Alternatively, if the first TA is a TA obtained through an (i−1)-th adjustment, and the TA adjustment is the i-th TA adjustment, the adjusted TA is equal to a sum of the first TA and the first TA adjustment step size, i being a positive integer and i>2.

For example, UE belongs to group 1, and parameters corresponding to group 1 in the first information include: a TA adjustment step size delta M, a TA adjustment time interval of 1 minute, and a TA adjustment trigger condition that a difference between two measured RSRPs is greater than a threshold N. Assuming that a TA indicated in a TAC is TA K, if at a moment t1, the TA adjustment trigger condition is met, that is, the difference between the two measured RSRP thresholds is greater than the threshold N, the UE will automatically adjust an uplink TA after a first duration subsequent to the moment t1 (the first duration>=0), and an adjusted TA=TAK (a current TA) indicated in the TAC+delta M. At TA adjustment time interval, or at TA adjustment time interval and on condition that the TA adjustment condition is met, the UE performs the TA adjustment again, and the adjusted TA=a TA obtained through last adjustment+delta M, i.e., the adjusted TA=TAK indicated in the TAC+an accumulated TA adjustment amount, for example, when the TA adjustment is a second TA adjustment, the accumulated TA adjustment amount=delta M+delta M.

For another example, the UE belongs to group 1, and the parameter corresponding to group 1 in the first information includes: the TA adjustment step size delta M and the TA adjustment time interval of 1 minute. Assuming that the TA indicated in the TAC is TAK, and the UE receives the TAC indicating TAK at the moment t1, the UE will automatically adjust the uplink TA after the first duration subsequent to the moment t1 (the first duration>=0), and the adjusted TA=TAK indicated in the TAC+delta M. At TA adjustment time interval, the UE performs the TA adjustment again, and the adjusted TA=the TA obtained through last adjustment+delta M, i.e., the adjusted TA=TAK indicated in the TAC+the accumulated TA adjustment amount, for example, when the TA adjustment is the second TA Adjustment, the accumulated TA adjustment amount=delta M+delta M.

For another example, the UE belongs to group 1, and the parameter corresponding to group 1 in the first information includes: the TA adjustment step size of delta M and the TA adjustment time interval of 1 minute. Assuming that the TA indicated in the TAC is TAK, and the UE receives the TAC indicating TAK at a moment t1, the UE will automatically adjust the uplink TA after the first duration subsequent to the moment t1 (the first duration>=0), and the adjusted TA=TAK indicated in the TAC+delta M. At TA adjustment time interval, the UE performs the TA adjustment again, and the adjusted TA=the TA obtained through last adjustment+delta M, i.e., the adjusted TA=TAK indicated in the TAC+the TA adjustment amount M.

Figure 6:
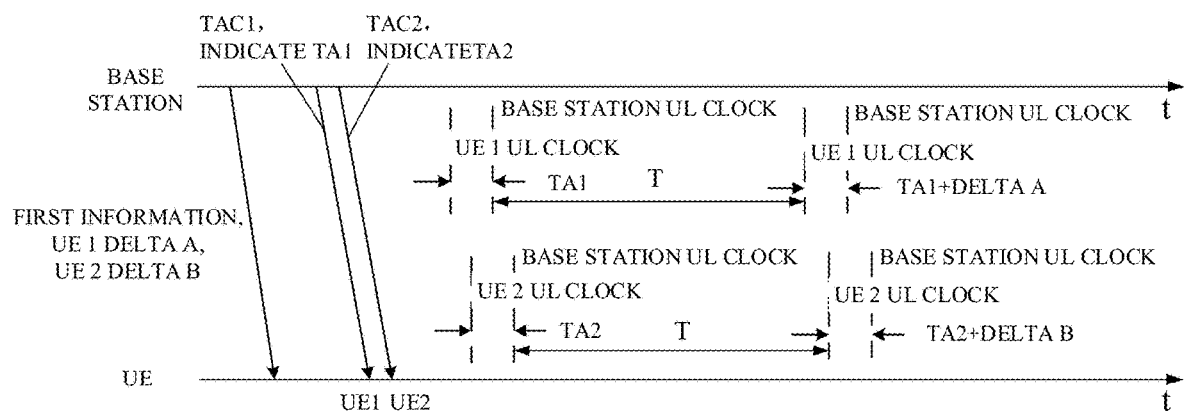
FIG. 6 is a schematic flowchart of uplink synchronization provided according to another implementation of the present disclosure.

Specifically, in Implementation 2, as illustrated in FIG. 6, assume that a base station indicates first information to UE 1 and UE 2 through broadcast or a dedicated RRC signaling, in the first information, a TA adjustment step size delta A corresponds to group identifier 1, a TA adjustment step size delta B corresponds to group identifier 2, UE 1 belongs to a group with group identifier 1, and UE 2 belongs to a group with group identifier 2. The base station transmits TAC 1 for UE 1, where TAC 1 indicates TA 1, and transmits TAC 2 for UE 2, where TAC 2 indicates TA 2. UE 1 adjusts uplink synchronization with the base station based on TA 1, that is, UE 1 transmits uplink information according to a timing advance of TA 1. UE 2 adjusts uplink synchronization with the base station based on TA 2, that is, UE 2 transmits uplink information according to a timing advance of TA 2. After UE 1 adjusts the uplink synchronization with the base station based on TA 1, UE 1 automatically adjusts an uplink TA after a duration T, and an adjusted TA=TA 1+delta A. UE 1 transmits uplink information according to a timing advance=TA 1+delta A. After UE 2 adjusts the uplink synchronization with the base station based on TA 2, UE 2 automatically adjusts an uplink TA after a duration T, an adjusted TA=TA 2+delta B. UE 2 transmits uplink information according to a timing advance=TA 2+delta B. Subsequently, UE 1 and UE 2 perform the TA adjustment again at time interval T Optionally, in Implementation 3, the first information includes: at least one TA adjustment information group, at least one order of use, and at least one group identifier, where the at least one order of use each indicates an order of use of one of the at least one TA adjustment information group, and the TA adjustment information group includes at least one of: a TA adjustment step size, a TA adjustment time interval, a TA adjustment time point, a TA adjustment trigger condition, and indication information for enabling an auxiliary uplink TA adjustment function.

It should be noted that, the at least one group identifier may be in one-to-one correspondence with the at least one order of use. The at least one order of use may explicitly indicate an order of use of the at least one TA adjustment information group, or the at least one order of use may also indicate the order of use of the at least one TA adjustment information group through a pattern.

For example, the first information includes TA adjustment information group 1, TA adjustment information group 2, order of use 1, order of use 2, group identifier 1, and group identifier 2. Group identifier 1 corresponds to order of use 1, and group identifier 2 corresponds to order of use 2. Order of use 1 indicates that an order of use of the two TA adjustment information groups is TA adjustment information group 1 and TA adjustment information group 2 sequentially. Order of use 2 indicates that an order of use of the two TA adjustment information groups is TA adjustment information group 2 and TA adjustment information group 1 sequentially. TA adjustment information group 1 includes TA adjustment step size 1 and TA adjustment time interval 1. TA adjustment information group 2 includes TA adjustment step size 2 and TA adjustment time interval 1. Assuming that UE 1 belongs to a group with group identifier 1, and UE 2 belongs to a group with group identifier 2, UE 1 determines, according to order of use 1, to use parameters in TA adjustment information group 1 and TA adjustment information group 2 sequentially to perform the TA adjustment, and UE 2 determines, according to order of use 2, to use parameters in TA adjustment information group 2 and TA adjustment information group 1 sequentially to perform the TA adjustment.

For another example, the first information includes TA adjustment information group 1, TA adjustment information group 2, order of use 1, order of use 2, group identifier 1, and group identifier 2. Group identifier 1 corresponds to order of use 1, and group identifier 2 corresponds to order of use 2. Order of use 1 indicates that the order of use of the two TA adjustment information groups is TA adjustment information group 1 and TA adjustment information group 2 sequentially. Order of use 2 indicates that the order of use of the two TA adjustment information groups is TA adjustment information group 2 and TA adjustment information group 1 sequentially. TA adjustment information group 1 includes TA adjustment step size 1 and TA adjustment time interval 1. TA adjustment information group 2 includes TA adjustment step size 2 and TA adjustment time interval 2. Assuming that UE 1 belongs to the group with group identifier 1, and UE 2 belongs to the group with group identifier 2, UE 1 determines according to order of use 1 to use the parameters in TA adjustment information group 1 and TA adjustment information group 2 sequentially to perform the TA adjustment, and UE 2 determines according to order of use 2 to use the parameters in TA adjustment information group 2 and TA adjustment information group 1 subsequently to perform the TA adjustment.

For another example, the first information includes TA adjustment information group 1, order of use 1, order of use 2, group identifier 1, and group identifier 2. Group identifier 1 corresponds to order of use 1, and group identifier 2 corresponds to order of use 2. TA adjustment information group 1 includes TA adjustment time interval 1, TA adjustment step size 1, and TA adjustment step size 2. Order or use 1 indicates to use TA adjustment step size 1 first, and then TA adjustment step size 2. Order or use 2 indicates to use TA adjustment step size 2 first, and then TA adjustment step size 1. Assuming that UE 1 belongs to the group with group identifier 1, and UE 2 belongs to the group with group identifier 2, UE 1 determines, according to order of use 1, to use the parameters in TA adjustment information group 1 sequentially to perform the TA adjustment, and UE 2 determines, according to order of use 2, to use the parameters in TA adjustment information group 1 subsequently to perform the TA adjustment.

Optionally, in Implementation 3, the terminal device determines a first order of use among the at least one order of use according to group information or a group identifier corresponding to the terminal device.

Optionally, in Implementation 3, the terminal device performs the TA adjustment according to the at least one TA adjustment information group, the first order of use, and a first TA. Alternatively, the terminal device performs the TA adjustment according to the at least one TA adjustment information group, the first order of use, and the first TA within a duration of a first timer.

Optionally, in Implementation 3, the terminal device may perform the TA adjustment according to the at least one TA adjustment information group, the first order of use, and the first TA as follows.

If the first TA is the TA indicated in the TAC MAC CE or the TA indicated in the RAR, and the TA adjustment is a first TA adjustment, an adjusted TA is equal to a sum of the first TA and the TA adjustment step size.

Alternatively, if the first TA is a TA obtained through an (i−1)-th adjustment, and the TA adjustment is an i-th TA adjustment, the adjusted TA is equal to a sum of the first TA and the TA adjustment step size, i being a positive integer and i>2.

Optionally, in Implementation 1 and Implementation 2 above, the group information or the group identifier corresponding to the terminal device is configured by the network device, or the group information or the group identifier corresponding to the terminal device is preset. Alternatively, the group information or the group identifier corresponding to the terminal device is determined by the terminal device.

It should be noted that, the group information or the group identifier corresponding to the terminal device can be understood as: the terminal device belongs to a terminal group indicated by the group information corresponding to the terminal device, or the terminal device belongs to a terminal group with the group identifier corresponding to the terminal device.

Optionally, in Implementation 2 and Implementation 3 above, when indicating the group identifier, the network device may indicate corresponding TA adjustment information, or when indicating at least part of the TA adjustment information, the network device may indicate the group identifier.

For example, the network device indicates group 1, a corresponding TA adjustment step is A, and a corresponding TA adjustment time interval is K. Alternatively, the network device indicates group 2, a corresponding TA adjustment step is B, and a corresponding TA adjustment time interval is L.

For example, the network device indicates group 1, a corresponding TA adjustment step size is A. Alternatively, the network device indicates group 2, a corresponding TA adjustment step size is B. The network device indicates a TA adjustment time interval L. Since the group identifier is not indicated, it means that the TA adjustment time interval of group 1 has a same value as the TA adjustment time interval of group 2.

Optionally, in Implementation 2 and Implementation 3 above, the group information or the group identifier corresponding to the terminal device may also be determined according to a first correspondence, the first correspondence indicates a correspondence between the at least one group identifier and at least one terminal identifier, and the at least one terminal identifier includes an identifier of the terminal device.

Optionally, the first correspondence is determined by the network device or the terminal device, such as pre-configured or pre-configured according to state information of the terminal device and/or the network device, or the first correspondence is preset.

The state information includes but is not limited to at least one of: location information, speed information, motion trajectory, a satellite orbit, an ephemeris, a measurement result, and measurement information.

It should be noted that, for the terminal device, the measurement result in the state information may be a measurement result of the terminal device on the network device, or a measurement result of the terminal device on a serving cell or a neighbor cell. For the network device, the measurement result in the state information may be a measurement result of the network device on the terminal device, or a measurement result of the network device on the serving cell or the neighbor cell of the terminal device. Optionally, the measurement result in the state information may be a RSRP, a reference signal receiving quality (RSRQ), a received signal strength indication (RSSI), a signal to interference plus noise ratio (SINR), a path loss, etc.

Similarly, for the terminal device, the measurement information in the state information may be measurement configuration information of the terminal device for the network device, or measurement configuration information of the terminal device for the serving cell or the neighbor cell. For the network device, the measurement information in the state information may be measurement configuration information of the network device for the terminal device, or measurement configuration information of the network device for the serving cell or the neighbor cell of the terminal device.

Optionally, the group information or the group identifier corresponding to the terminal device is predefined or determined by the terminal device or the network device.

Specifically, the group information or the group identifier corresponding to the terminal device is predefined or determined by the terminal device or the network device according to the state information of the terminal device or the network device.

The state information includes but is not limited to at least one of: location information, speed information, motion trajectory, a satellite orbit, an ephemeris, a measurement result, and measurement information.

For example, the network device transmits first configuration information to the terminal device, where the first configuration information is used to configure the group information or the group identifier corresponding to the terminal device, and/or the first configuration information is used to configure a first correspondence, the first correspondence indicates a correspondence between the at least one group identifier and at least one terminal identifier, and the at least one terminal identifier includes an identifier of the terminal device.

Therefore, compared with Implementation 1, in Implementation 2 and Implementation 3, the network device configures different TA applicability adjustment parameters for different terminal groups, which can more flexibly match terminal devices with different positions, speeds, motion trajectories, satellite orbits, ephemerides, measurement results, measurement information, and the like, thereby providing finer adjustment granularity, and better ensuring synchronization between the terminal device and the network device. Further, these different parameters can be used for different terminal groups, and may also be used at different moments, so that different adjustment values are given in different situations, thereby more effectively matching TA changes.

Further, in Implementation 3, all UEs within cell coverage can use these multiple sets of TA adjustment information. That is, each UE can use multiple sets of TA adjustment information, instead of different users using different TA adjustment information.

Optionally, in Implementation 4, the first information includes: at least one TA adjustment information group and a TA adjustment order, where the TA adjustment order indicates an order of use of the at least one TA adjustment information group, and the TA adjustment information group includes at least one of: a TA adjustment step size, a TA adjustment time interval, a TA adjustment time point, a TA adjustment trigger condition, and indication information for enabling an auxiliary uplink TA adjustment function.

It should be noted that, the TA adjustment order may explicitly indicate an order of use of the at least one TA adjustment information group, or the TA adjustment order may also indicate the order of use of the at least one TA adjustment information group through a pattern.

Optionally, in Implementation 4, the terminal device performs the TA adjustment according to the at least one TA adjustment information group, the TA adjustment order, and a first TA. Alternatively, the terminal device performs the TA adjustment according to the at least one TA adjustment information group, the TA adjustment order, and the first TA within a duration of a first timer.

Optionally, in Implementation 4, the terminal device may perform the TA adjustment according to the at least one TA adjustment information group, the TA adjustment order, and the first TA as follows.

If the first TA is the TA indicated in the TAC MAC CE or the TA indicated in the RAR, and the TA adjustment is a first TA adjustment, an adjusted TA is equal to a sum of the first TA and the TA adjustment step size.

Alternatively, if the first TA is a TA obtained through an (i−1)-th adjustment, and the TA adjustment is an i-th TA adjustment, the adjusted TA is equal to a sum of the first TA and the TA adjustment step size, i being a positive integer and i>2.

Therefore, in Implementation 4, all UEs within cell coverage can use these multiple sets of TA adjustment information, and there is no need to group the UEs. That is, each UE can use multiple sets of TA adjustment information, instead of different users using different TA adjustment information. Compared with Implementation 3, in Implementation 4, complexity of UE grouping can be avoided.

It should be noted that, in the first information, the TA adjustment step size may also be referred to as a TA adjustment amount for each time.

Optionally, in the first information, the TA adjustment time interval may refer to how often the terminal device performs the TA adjustment.

Optionally, in the first information, the TA adjustment time point may refer to a time point when the terminal device performs the TA adjustment for the first time or a time point when the terminal device performs the TA adjustment.

Optionally, in the first information, the TA adjustment trigger condition includes at least one of: a difference between two measured positions of the terminal device being greater than a threshold, a difference between two measured RSRPs of the terminal device being greater than a threshold, and a speed of the terminal device being greater than a threshold.

It should be noted that, the difference between the two measured positions of the terminal device may refer to a difference between positions of the terminal device with respect to the base station at two measurements, a difference between positions of the terminal device per se at two measurements, or a difference between positions of the terminal device with respect to reference coordinates at two measurements.

Therefore, in implementations of the present disclosure, the terminal device can perform the TA adjustment adaptively based on the first information configured by the network device for TA adjustment. In this way, overhead of frequent TAC indications and inapplicability of a TA adjustment amount (that is, when the terminal device receives a TAC, a TA indicated in the TAC may be inaccurate due to delay) can be avoided, thereby ensuring synchronization between the terminal device and the network device.

Figure 7:
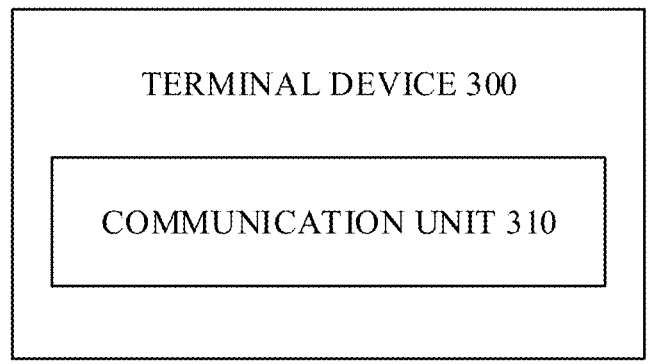
FIG. 7 is a schematic block diagram of a terminal device provided according to an implementation of the present disclosure.

FIG. 7 is a schematic block diagram of a terminal device 300 according to an implementation of the present disclosure. As illustrated in FIG. 7, the terminal device 300 includes a communication unit 310.

The communication unit 310 is configured to receive first information transmitted by a network device, where the first information is used for a TA adjustment.

Optionally, the first information includes at least one of: a TA adjustment step size, a TA adjustment time interval, a TA adjustment time point, a TA adjustment trigger condition, and indication information for enabling an auxiliary uplink TA adjustment function.

Optionally, the terminal device 300 further includes a processing unit 320.

The processing unit 320 is configured to perform the TA adjustment according to the first information and a first TA.

Optionally, the first TA is one of: a TA indicated in a TAC MAC CE, a TA indicated in an RAR, and a TA obtained through last adjustment.

Optionally, if the first TA is the TA indicated in the TAC MAC CE or the TA indicated in the RAR, and the TA adjustment is a first TA adjustment, an adjusted TA is equal to a sum of the first TA and the TA adjustment step size.

Alternatively, if the first TA is the TA indicated in the TAC MAC CE or the TA indicated in the RAR, and the TA adjustment is an i-th TA adjustment, the adjusted TA is equal to a sum of the first TA and i TA adjustment values, i being a positive integer and i>1.

Alternatively, if the first TA is a TA obtained through an (i−1)-th adjustment, and the TA adjustment is the i-th TA adjustment, the adjusted TA is equal to a sum of the first TA and the TA adjustment step size, i being a positive integer and i>2.

Optionally, the first information includes at least one of: at least one TA adjustment step size, at least one TA adjustment time interval, at least one TA adjustment time point, at least one TA adjustment trigger condition, at least one group identifier, and at least one indication information for enabling an auxiliary uplink TA adjustment function.

Optionally, at least part of the first information satisfies a one-to-one correspondence.

Optionally, at least part of the first information satisfies a one-to-many correspondence.

Optionally, at least one of the following, which is used by terminal groups with different group identifiers in the first information, has different values: a TA adjustment step size, a TA adjustment time interval, a TA adjustment time point, a TA adjustment trigger condition, and indication information for enabling an auxiliary uplink TA adjustment function.

Optionally, the terminal device 300 further includes a processing unit 320.

The processing unit 320 is configured to determine first TA adjustment information in the first information according to group information or a group identifier corresponding to the terminal device.

The first TA adjustment information includes at least one of: a first TA adjustment step size, a first TA adjustment time interval, a first TA adjustment time point, a first TA adjustment trigger condition, and first indication information for enabling an auxiliary uplink TA adjustment function.

Optionally, the processing unit 320 is further configured to perform the TA adjustment according to the first TA adjustment information and a first TA.

Optionally, the first TA is one of: a TA indicated in a TAC MAC CE, a TA indicated in an RAR, and a TA obtained through last adjustment.

Optionally, if the first TA is the TA indicated in the TAC MAC CE or the TA indicated in the RAR, and the TA adjustment is a first TA adjustment, an adjusted TA is equal to a sum of the first TA and the first TA adjustment step size.

Alternatively, if the first TA is the TA indicated in the TAC MAC CE or the TA indicated in the RAR, and the TA adjustment is an i-th TA adjustment, the adjusted TA is equal to a sum of the first TA and i TA adjustment values, i being a positive integer and i>1.

Alternatively, if the first TA is a TA obtained through an (i−1)-th adjustment, and the TA adjustment is the i-th TA adjustment, the adjusted TA is equal to a sum of the first TA and the first TA adjustment step size, i being a positive integer and i>2.

Optionally, the first information includes: at least one TA adjustment information group, at least one order of use, and at least one group identifier, where the at least one order of use each indicates an order of use of one of the at least one TA adjustment information group, and the TA adjustment information group includes at least one of: a TA adjustment step size, a TA adjustment time interval, a TA adjustment time point, a TA adjustment trigger condition, and indication information for enabling an auxiliary uplink TA adjustment function.

Optionally, the terminal device 300 further includes a processing unit 320.

The processing unit 320 is configured to determine a first order of use among the at least one order of use according to group information or a group identifier corresponding to the terminal device.

Optionally, the processing unit 320 is further configured to perform the TA adjustment according to the at least one TA adjustment information group, the first order of use, and a first TA.

Optionally, the first TA is one of: a TA indicated in a TAC MAC CE, a TA indicated in an RAR, and a TA obtained through last adjustment.

Optionally, if the first TA is the TA indicated in the TAC MAC CE or the TA indicated in the RAR, and the TA adjustment is a first TA adjustment, an adjusted TA is equal to a sum of the first TA and the TA adjustment step size.

Alternatively, if the first TA is a TA obtained through an (i−1)-th adjustment, and the TA adjustment is an i-th TA adjustment, the adjusted TA is equal to a sum of the first TA and the TA adjustment step size, i being a positive integer and i>2.

Optionally, the first information includes: at least one TA adjustment information group and a TA adjustment order, where the TA adjustment order indicates an order of use of the at least one TA adjustment information group, and the TA adjustment information group includes at least one of: a TA adjustment step size, a TA adjustment time interval, a TA adjustment time point, a TA adjustment trigger condition, and indication information for enabling an auxiliary uplink TA adjustment function.

Optionally, the terminal device 300 further includes a processing unit 320.

The processing unit 320 is configured to perform the TA adjustment according to the at least one TA adjustment information group, the TA adjustment order, and a first TA.

Optionally, the first TA is one of: a TA indicated in a TAC MAC CE, a TA indicated in an RAR, and a TA obtained through last adjustment.

Optionally, if the first TA is the TA indicated in the TAC MAC CE or the TA indicated in the RAR, and the TA adjustment is a first TA adjustment, an adjusted TA is equal to a sum of the first TA and the TA adjustment step size.

Alternatively, if the first TA is a TA obtained through an (i−1)-th adjustment, and the TA adjustment is an i-th TA adjustment, the adjusted TA is equal to a sum of the first TA and the TA adjustment step size, i being a positive integer and i>2.

Optionally, the group information or the group identifier corresponding to the terminal device 300 is configured by the network device, or the group information or the group identifier corresponding to the terminal device 300 is preset.

Optionally, the group information or the group identifier corresponding to the terminal device 300 is determined according to a first correspondence, the first correspondence indicates a correspondence between the at least one group identifier and at least one terminal identifier, and the at least one terminal identifier includes an identifier of the terminal device.

Optionally, the first correspondence is pre-configured or configured by the network device, the first correspondence is preset, or the first correspondence is determined by the terminal device.

Optionally, the first correspondence is determined according to state information of the network device and/or the terminal device.

The state information includes at least one of: location information, speed information, motion trajectory, a satellite orbit, an ephemeris, a measurement result, and measurement information.

Optionally, the group information or the group identifier corresponding to the terminal device 300 is predefined or determined by the terminal device and/or the network device.

Optionally, the group information or the group identifier corresponding to the terminal device 300 is predefined or determined by the terminal device and/or the network device according to state information of the network device and/or the terminal device.

The state information includes at least one of: location information, speed information, motion trajectory, a satellite orbit, an ephemeris, a measurement result, and measurement information.

Optionally, the TA adjustment trigger condition includes at least one of: a difference between two measured positions of the terminal device being greater than a threshold, a difference between two measured RSRPs of the terminal device being greater than a threshold, and a speed of the terminal device being greater than a threshold.

Optionally, the terminal device 300 further includes a processing unit 320.

The processing unit 320 is configured to perform the TA adjustment according to the first information and a first TA within a duration of a first timer.

Optionally, the communication unit 310 is further configured to receive second information transmitted by the network device, where a second TA is indicated in the second information.

The processing unit 320 is further configured to adjust uplink synchronization according to the second TA.

The first timer is started when the second information is received, or the first timer is started when adjustment of the uplink synchronization according to the second TA is completed.

Optionally, the second information is information or a DL-SCH carrying a TAC MAC CE, or the second information is an RAR.

Optionally, the communication unit 310 is further configured to receive third information within the duration of the first timer, where a third TA is indicated in the third information.

The processing unit 320 is further configured to adjust uplink synchronization according to the third TA.

Optionally, the third information is information or a DL-SCH carrying a TAC MAC CE, or the third information is an RAR.

Optionally, the first TA is one of: a TA indicated in a TAC MAC CE, a TA indicated in an RAR, and a TA obtained through last adjustment.

Optionally, the communication unit 310 is specifically configured to receive the first information transmitted by the network device through broadcast or a dedicated RRC signaling.

Optionally, the communication unit 310 is further configured to transmit first indication information to the network device, where the first indication information indicates that the terminal device 300 has a TA adjustment capability.

Optionally, the terminal device 300 further includes a processing unit 320.

The processing unit 320 is configured to ignore or skip the first information if the terminal device 300 does not have a TA adjustment capability.

It should be understood that, the terminal device 300 according to implementations of the present disclosure may correspond to the terminal device in method implementations of the present disclosure, and the above and other operations and/or functions of each unit in the terminal device 300 are for implementing corresponding operations of the terminal device in the method 200 illustrated in FIG. 4 respectively, which will not be repeated herein for the sake of simplicity.

Figure 8:
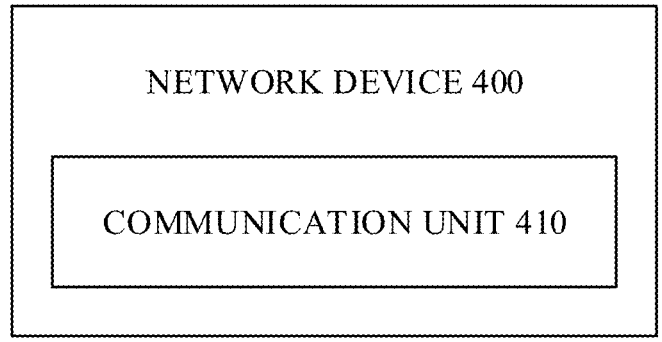
FIG. 8 is a schematic block diagram of a network device provided according to an implementation of the present disclosure.

FIG. 8 is a schematic block diagram of a network device 400 according to an implementation of the present disclosure. As illustrated in FIG. 8, the network device 400 includes a communication unit 410.

The communication unit 410 is configured to transmit first information to a terminal device, where the first information is used for a TA adjustment.

Optionally, the first information includes at least one of: a TA adjustment step size, a TA adjustment time interval, a TA adjustment time point, a TA adjustment trigger condition, and indication information for enabling an auxiliary uplink TA adjustment function.

Optionally, the first information includes at least one of: at least one TA adjustment step size, at least one TA adjustment time interval, at least one TA adjustment time point, at least one TA adjustment trigger condition, at least one group identifier, and at least one indication information for enabling an auxiliary uplink TA adjustment function.

Optionally, at least part of the first information satisfies a one-to-one correspondence.

Optionally, at least part of the first information satisfies a one-to-many correspondence.

Optionally, at least one of the following, which is used by terminal groups with different group identifiers in the first information, has different values: a TA adjustment step size, a TA adjustment time interval, a TA adjustment time point, a TA adjustment trigger condition, and indication information for enabling an auxiliary uplink TA adjustment function.

Optionally, the first information includes: at least one TA adjustment information group, at least one order of use, and at least one group identifier, where the at least one order of use each indicates an order of use of one of the at least one TA adjustment information group, and the TA adjustment information group includes at least one of: a TA adjustment step size, a TA adjustment time interval, a TA adjustment time point, a TA adjustment trigger condition, and indication information for enabling an auxiliary uplink TA adjustment function.

Optionally, the first information includes: at least one TA adjustment information group and a TA adjustment order, where the TA adjustment order indicates an order of use of the at least one TA adjustment information group, and the TA adjustment information group includes at least one of: a TA adjustment step size, a TA adjustment time interval, a TA adjustment time point, a TA adjustment trigger condition, and indication information for enabling an auxiliary uplink TA adjustment function.

Optionally, the communication unit 410 is further configured to transmit first configuration information to the terminal device, where the first configuration information is used to configure group information or a group identifier corresponding to the terminal device, or the first configuration information is used to configure a first correspondence, the first correspondence indicates a correspondence between the at least one group identifier and at least one terminal identifier, and the at least one terminal identifier includes an identifier of the terminal device.

Optionally, the first correspondence is configured by the network device 400 according to state information of the network device, the state information includes at least one of: location information, speed information, motion trajectory, a satellite orbit, an ephemeris, a measurement result, and measurement information.

Optionally, the TA adjustment trigger condition includes at least one of: a difference between two measured positions of the terminal device being greater than a threshold, a difference between two measured RSRPs of the terminal device being greater than a threshold, and a speed of the terminal device being greater than a threshold.

Optionally, the communication unit 410 is further configured to transmit second information to the terminal device, where a second TA is indicated in the second information, and the second TA is used for the terminal device to adjust uplink synchronization.

Optionally, the second information is information or a DL-SCH carrying a TAC MAC CE, or the second information is an RAR.

Optionally, the communication unit 410 is further configured to transmit second configuration information to the terminal device, where the second configuration information is used to configure a first timer, and the terminal device is configured to perform the TA adjustment according to the first information and a first TA within a duration of the first timer.

Optionally, the first TA is one of: a TA indicated in a TAC MAC CE, a TA indicated in an RAR, and a TA obtained through last adjustment.

Optionally, the first timer is started when the second information is received

Alternatively, the first timer is started when the uplink synchronization is adjusted according to the second TA.

Optionally, the communication unit 410 is further configured to transmit third information to the terminal device within the duration of the first timer, where a third TA is indicated in the third information, and the third TA is used for the terminal device to adjust the uplink synchronization.

Optionally, the third information is information or a DL-SCH carrying a TAC MAC CE, or the third information is an RAR.

Optionally, the communication unit 410 is specifically configured to transmit the first information to the terminal device through broadcast or a dedicated RRC signaling.

Optionally, the communication unit 410 is further configured to receive first indication information transmitted by the terminal device, where the first indication information indicates that the terminal device has a TA adjustment capability.

It should be understood that, the network device 400 according to implementations of the present disclosure may correspond to the network device in method implementations of the present disclosure, and the above and other operations and/or functions of each unit in the network device 400 are for implementing corresponding operations of the network device in the method 200 illustrated in FIG. 4 respectively, which will not be repeated herein for the sake of simplicity.

Figure 9:
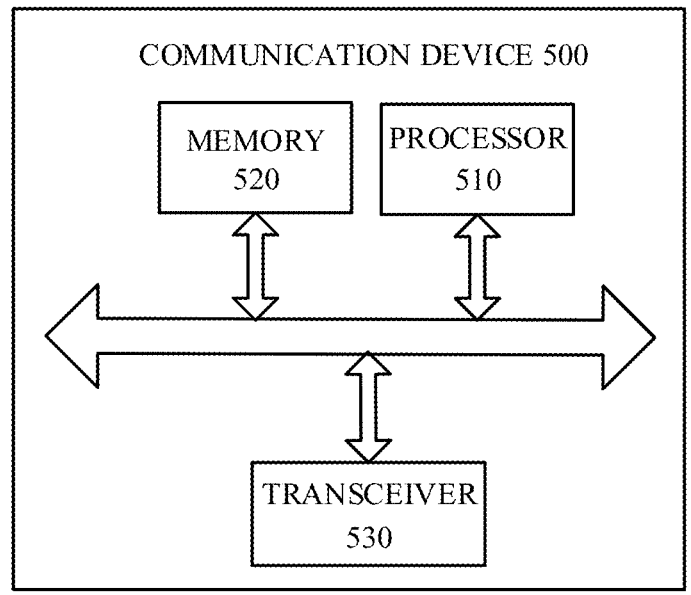
FIG. 9 is a schematic block diagram of a communication device provided according to an implementation of the present disclosure.

FIG. 9 is a schematic structural diagram of a communication device 500 provided in an implementation of the present disclosure. As illustrated in FIG. 9, the communication device 500 includes a processor 510. The processor 510 can invoke and execute computer programs stored in a memory to perform the method provided in implementations of the present disclosure.

Optionally, as illustrated in FIG. 9, the communication device 500 can further include the memory 520. Specifically, the processor 510 can invoke and execute the computer programs stored in the memory 520 to perform the method provided in implementations of the present disclosure.

The memory 520 may be a separate device independent of the processor 510, or may be integrated into the processor 510.

Optionally, as illustrated in FIG. 9, the communication device 500 can further include a transceiver 530. The processor 510 can control the transceiver 530 to communicate with other devices, for example, to transmit information or data to other devices, or to receive information or data from other devices.

The transceiver 530 may include a transmitter and a receiver. The transceiver 530 may further include an antenna, where one or more antennas can be provided.

Optionally, the communication device 500 may be the network device or base station of implementations of the present disclosure, and the communication device 500 can implement the operations performed by the network device or base station described in the foregoing method implementations of the present disclosure, which will not be repeated herein for the sake of simplicity.

Optionally, the communication device 500 may be the mobile terminal/terminal device of implementations of the present disclosure, and the communication device 500 can implement the operations performed by the mobile terminal/terminal device described in the foregoing method implementations of the present disclosure, which will not be repeated herein for the sake of simplicity.

Figure 10:
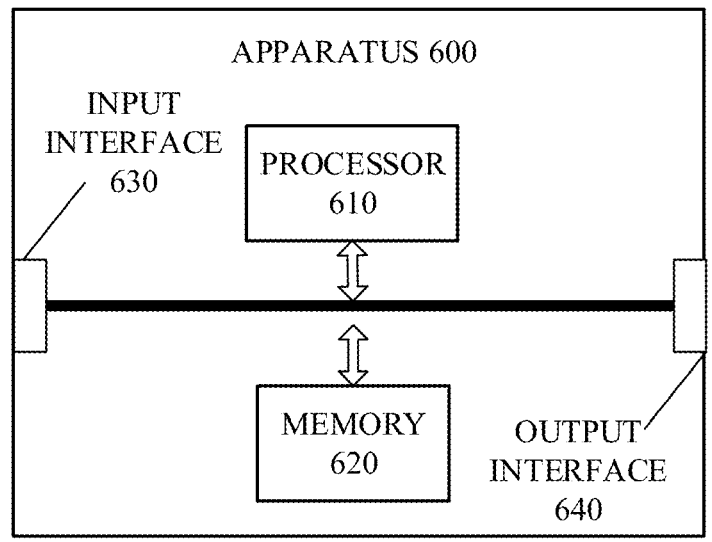
FIG. 10 is a schematic block diagram of an apparatus provided according to an implementation of the present disclosure.

FIG. 10 is a schematic structural diagram of an apparatus according to an implementation of the present disclosure. As illustrated in FIG. 10, the apparatus 600 includes a processor 610. The processor 610 is configured to invoke and execute computer programs stored in a memory to perform the method provided in implementations of the present disclosure.

Optionally, as illustrated in FIG. 10, the apparatus 600 further includes a memory 620. The processor 610 can invoke and execute the computer programs stored in the memory 620 to perform the method provided in implementations of the present disclosure.

The memory 620 may be a separate device independent of the processor 610, or may be integrated into the processor 610.

Optionally, the apparatus 600 may further include an input interface 630. The processor 610 can control the input interface 630 to communicate with other devices or chips, for example, specifically, to acquire information or data sent by other devices or chips.

Optionally, the apparatus 600 may further include an output interface 640. The processor 610 can control the output interface 640 to communicate with other devices or chips, for example, specifically, to output information or data to other devices or chips.

Optionally, the apparatus 600 is applicable to the network device or base station of implementations of the present disclosure. The apparatus can implement the operations performed by the network device or base station described in the foregoing method implementations, which will not be repeated herein for the sake of simplicity.

Optionally, the apparatus 600 is applicable to the mobile terminal/terminal device of implementations of the present disclosure. The apparatus can implement the operations performed by the mobile terminal/terminal device described in the foregoing method implementations, which will not be repeated herein for the sake of simplicity.

Optionally, the apparatus mentioned in implementations of the present disclosure may also be a chip, such as a system level chip, a system chip, a chip system, an on-chip system chip, etc.

Figure 11:
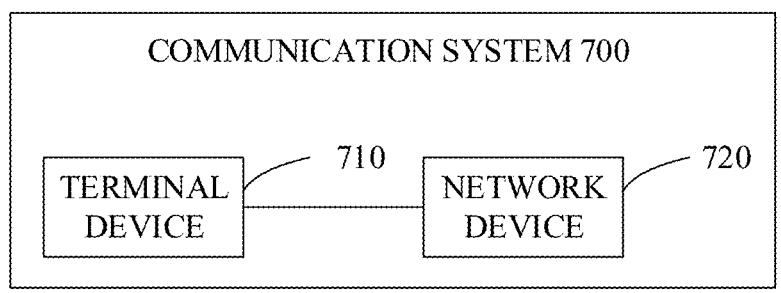
FIG. 11 is a schematic block diagram of a communication system provided according to an implementation of the present disclosure.

FIG. 11 is a schematic block diagram of a communication system 700 provided in an implementation of the present disclosure. As illustrated in FIG. 11, the communication system 700 includes a terminal device 710 and a network device 720.

The terminal device 710 may be configured to implement the corresponding function implemented by the terminal device in the above method, and the network device 720 may be configured to implement the corresponding function implemented by the network device or base station in the above method, which will not be repeated herein for the sake of simplicity.

It should be understood that, the processor referred to herein may be an integrated circuit chip with signal processing capabilities. During implementation, each step of the foregoing method may be completed by an integrated logic circuit in the form of hardware or an instruction in the form of software in the processor. The processor may be a general-purpose processor, a digital signal processor (DSP), an application specific integrated circuit (ASIC), a field programmable gate array (FPGA), or other programmable logic devices, discrete gates or transistor logic devices, or discrete hardware components, which can implement or perform the methods, steps, and logic blocks disclosed in implementations. The general purpose processor may be a microprocessor, or the processor may be any conventional processor or the like. The steps of the method disclosed in implementations may be implemented through a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware of the processor.

It can be understood that, the memory according to implementations of the present disclosure may be a volatile memory or a non-volatile memory, or may include both the volatile memory and the non-volatile memory. The non-volatile memory may be a ROM, a PROM, an erasable programmable read only memory (erasable PROM, EPROM), an electrically erasable programmable read only memory (electrically EPROM, EEPROM), or a flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link dynamic random access memory (synch-link DRAM, SLDRAM), and a direct rambus RAM (DRRAM). It should be noted that, the memory of systems and methods described herein is intended to include, but is not limited to, these and any other suitable types of memories.

It should be understood that, the above description of the memory is intended for illustration rather than limitation. For example, the memory of implementations may also be an SRAM, a DRAM, an SDRAM, a DDR SDRAM, an ESDRAM, an SLDRAM, a DR RAM, etc. In other words, the memory of implementations is intended to include, but is not limited to, these and any other suitable types of memory.

Implementations of the present disclosure further provide a computer-readable storage medium. The computer-readable storage medium is configured to store computer programs.

Optionally, the computer-readable storage medium is applicable to the network device or base station of implementations of the present disclosure. The computer programs are operable with a computer to implement the operations performed by the network device or base station described in the foregoing method implementations, which will not be repeated herein for the sake of simplicity.

Optionally, the computer-readable storage medium is applicable to the mobile terminal/terminal device of implementations of the present disclosure. The computer programs are operable with a computer to implement the operations performed by the mobile terminal/terminal device described in the foregoing method implementations, which will not be repeated herein for the sake of simplicity.

Implementations of the present disclosure further provide a computer program product. The computer program product includes computer program instructions.

Optionally, the computer program product is applicable to the network device or base station of implementations of the present disclosure. The computer program instructions are operable with a computer to implement the operations performed by the network device or base station described in the foregoing method implementations, which will not be repeated herein for the sake of simplicity.

Optionally, the computer program product is applicable to the mobile terminal/terminal device of implementations of the present disclosure. The computer program instructions are operable with a computer to implement the operations performed by the mobile terminal/terminal device described in the foregoing method implementations, which will not be repeated herein for the sake of simplicity.

Implementations of the present disclosure further provide a computer program.

Optionally, the computer program is applicable to the network device or base station of implementations of the present disclosure. The computer program, when executed by a computer, is operable with the computer to implement the operations performed by the network device or base station described in the foregoing method implementations, which will not be repeated herein for the sake of simplicity.

Optionally, the computer program is applicable to the mobile terminal/terminal device of implementations of the present disclosure. The computer program, when executed by a computer, is operable with the computer to implement the operations performed by the mobile terminal/terminal device described in the foregoing method implementations, which will not be repeated herein for the sake of simplicity.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations herein may also be implemented in various other manners. For example, the above apparatus implementations are merely illustrative, e.g., the division of units is only a division of logical functions, and other manners of division may also available in practice, e.g., multiple units or assemblies may be combined or may be integrated into another system, or some features may be ignored or omitted. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

In addition, various functional units described in implementations herein may be integrated into one processing unit or may be present as a number of physically separated units, and two or more units may be integrated into one.

If the integrated units are implemented as software functional units and sold or used as standalone products, they may be stored in a computer-readable storage medium. For such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A wireless communication method, comprising:
receiving, by a terminal device, first information transmitted by a network device, wherein the first information is used for a timing advance (TA) adjustment, and the first information comprises a TA adjustment step size and a TA adjustment time point; and
performing, by the terminal device, the TA adjustment according to the first information and a first TA, wherein
the first information further comprises at least one of: a TA adjustment time interval, a TA adjustment trigger condition, and indication information for enabling an auxiliary uplink TA adjustment function, and
if the first TA is a TA indicated in a timing advance command (TAC) media access control-control element (MAC CE) or a TA indicated in a random access response (RAR), and the TA adjustment is a first TA adjustment, an adjusted TA is equal to a sum of the first TA and the TA adjustment step size;
if the first TA is the TA indicated in the TAC MAC CE or the TA indicated in the RAR, and the TA adjustment is an i-th TA adjustment, the adjusted TA is equal to a sum of the first TA and i TA adjustment values, i being a positive integer and i>1; or
if the first TA is a TA obtained through an (i−1)-th adjustment, and the TA adjustment is the i-th TA adjustment, the adjusted TA is equal to a sum of the first TA and the TA adjustment step size, i being a positive integer and i>2.

2. The method of claim 1, wherein the TA adjustment trigger condition comprises at least one of:
a difference between two measured positions of the terminal device being greater than a threshold, a difference between two measured reference signal receiving powers (RSRP) of the terminal device being greater than a threshold, and a speed of the terminal device being greater than a threshold.

3. The method of claim 1, wherein the first information comprises:
at least one TA adjustment information group, at least one order of use, and at least one group identifier, wherein the at least one order of use each indicates an order of use of one of the at least one TA adjustment information group, and the TA adjustment information group comprises the TA adjustment step size, the TA adjustment time point, and at least one of:
the TA adjustment time interval, the TA adjustment trigger condition, and the indication information for enabling an auxiliary uplink TA adjustment function.

4. The method of claim 3, further comprising:
determining, by the terminal device, a first order of use among the at least one order of use according to group information or a group identifier corresponding to the terminal device.

5. The method of claim 1, wherein the first information comprises:
at least one TA adjustment information group and a TA adjustment order, wherein the TA adjustment order indicates an order of use of the at least one TA adjustment information group, and the TA adjustment information group comprises the TA adjustment step size, the TA adjustment time point, and at least one of:
the TA adjustment time interval, the TA adjustment trigger condition, and the indication information for enabling an auxiliary uplink TA adjustment function.

6. The method of claim 5, further comprising:
performing, by the terminal device, the TA adjustment according to the at least one TA adjustment information group, the TA adjustment order, and the first TA.

7. The method of claim 1, further comprising:
performing, by the terminal device, the TA adjustment according to the first information and the first TA within a duration of a first timer.

8. The method of claim 1, further comprising:
transmitting, by the terminal device, first indication information to the network device, wherein the first indication information indicates that the terminal device has a TA adjustment capability.

9. The method of claim 1, further comprising:
ignoring or skipping, by the terminal device, the first information if the terminal device does not have a TA adjustment capability.

10. A wireless communication method, comprising:
transmitting, by a network device, first information to a terminal device, wherein the first information is used for a timing advance (TA) adjustment, the first information comprises a TA adjustment step size and a TA adjustment time point, and the first information and a first TA are used for the terminal device to perform the TA adjustment, wherein
the first information further comprises at least one of: a TA adjustment time interval, a TA adjustment trigger condition, and indication information for enabling an auxiliary uplink TA adjustment function, and
if the first TA is a TA indicated in a timing advance command (TAC) media access control-control element (MAC CE) or a TA indicated in a random access response (RAR), and the TA adjustment is a first TA adjustment, an adjusted TA is equal to a sum of the first TA and the TA adjustment step size;
if the first TA is the TA indicated in the TAC MAC CE or the TA indicated in the RAR, and the TA adjustment is an i-th TA adjustment, the adjusted TA is equal to a sum of the first TA and i TA adjustment values, i being a positive integer and i>1; or
if the first TA is a TA obtained through an (i−1)-th adjustment, and the TA adjustment is the i-th TA adjustment, the adjusted TA is equal to a sum of the first TA and the TA adjustment step size, i being a positive integer and i>2.

11. The method of claim 10, wherein the first information comprises:
at least one TA adjustment information group, at least one order of use, and at least one group identifier, wherein the at least one order of use each indicates an order of use of one of the at least one TA adjustment information group, and the TA adjustment information group comprises the TA adjustment step size, the TA adjustment time point, and at least one of:
the TA adjustment time interval, the TA adjustment trigger condition, and the indication information for enabling an auxiliary uplink TA adjustment function.

12. A terminal device, comprising:
a processor;
a transceiver; and
a memory configured to store computer programs;
wherein the processor is configured to execute the computer programs stored in the memory to:
cause the transceiver to receive first information transmitted by a network device, wherein the first information is used for a timing advance (TA) adjustment, and the first information comprises a TA adjustment step size and a TA adjustment time point; and
perform the TA adjustment according to the first information and a first TA, wherein
the first information further comprises at least one of:
a TA adjustment time interval, a TA adjustment trigger condition, and indication information for enabling an auxiliary uplink TA adjustment function, and
if the first TA is a TA indicated in a timing advance command (TAC) media access control-control element (MAC CE) or a TA indicated in a random access response (RAR), and the TA adjustment is a first TA adjustment, an adjusted TA is equal to a sum of the first TA and the TA adjustment step size;
if the first TA is the TA indicated in the TAC MAC CE or the TA indicated in the RAR, and the TA adjustment is an i-th TA adjustment, the adjusted TA is equal to a sum of the first TA and i TA adjustment values, i being a positive integer and i>1; or
if the first TA is a TA obtained through an (i−1)-th adjustment, and the TA adjustment is the i-th TA adjustment, the adjusted TA is equal to a sum of the first TA and the TA adjustment step size, i being a positive integer and i>2.

13. The terminal device of claim 12, wherein the first information comprises:

at least one TA adjustment information group, at least one order of use, and at least one group identifier, wherein the at least one order of use each indicates an order of use of one of the at least one TA adjustment information group, and the TA adjustment information group comprises the TA adjustment step size, the TA adjustment time point, and at least one of:
the TA adjustment time interval, the TA adjustment trigger condition, and the indication information for enabling an auxiliary uplink TA adjustment function.

14. The terminal device of claim 13, the processor is further configured to:
determine a first order of use among the at least one order of use according to group information or a group identifier corresponding to the terminal device.

15. The terminal device of claim 12, wherein the first information comprises:
at least one TA adjustment information group and a TA adjustment order, wherein the TA adjustment order indicates an order of use of the at least one TA adjustment information group, and the TA adjustment information group comprises the TA adjustment step size, the TA adjustment time point, and at least one of:
the TA adjustment time interval, the TA adjustment trigger condition, and the indication information for enabling an auxiliary uplink TA adjustment function.

16. The terminal device of claim 15, the processor is further configured to:
perform the TA adjustment according to the at least one TA adjustment information group, the TA adjustment order, and the first TA.

17. The terminal device of claim 12, wherein the TA adjustment trigger condition comprises at least one of:
a difference between two measured positions of the terminal device being greater than a threshold, a difference between two measured reference signal receiving powers (RSRP) of the terminal device being greater than a threshold, and a speed of the terminal device being greater than a threshold.

18. The terminal device of claim 12, the processor is further configured to:
perform the TA adjustment according to the first information and the first TA within a duration of a first timer.

19. A network device, comprising:
a processor;
a transceiver; and
a memory configured to store computer programs;
wherein the processor is configured to execute the computer programs stored in the memory to cause the transceiver to:
transmit first information to a terminal device, wherein the first information is used for a timing advance (TA) adjustment, the first information comprises a TA adjustment step size and a TA adjustment time point, and the first information and a first TA are used for the terminal device to perform the TA adjustment, wherein
the first information further comprises at least one of: a TA adjustment time interval, a TA adjustment trigger condition, and indication information for enabling an auxiliary uplink TA adjustment function, and
if the first TA is a TA indicated in a timing advance command (TAC) media access control-control element (MAC CE) or a TA indicated in a random access response (RAR), and the TA adjustment is a first TA adjustment, an adjusted TA is equal to a sum of the first TA and the TA adjustment step size;
if the first TA is the TA indicated in the TAC MAC CE or the TA indicated in the RAR, and the TA adjustment is an i-th TA adjustment, the adjusted TA is equal to a sum of the first TA and i TA adjustment values, i being a positive integer and i>1; or
if the first TA is a TA obtained through an (i−1)-th adjustment, and the TA adjustment is the i-th TA adjustment, the adjusted TA is equal to a sum of the first TA and the TA adjustment step size, i being a positive integer and i>2.

20. The network device of claim 19, wherein the first information comprises:
at least one TA adjustment information group, at least one order of use, and at least one group identifier, wherein the at least one order of use each indicates an order of use of one of the at least one TA adjustment information group, and the TA adjustment information group comprises the TA adjustment step size, the TA adjustment time point, and at least one of:
the TA adjustment time interval, the TA adjustment trigger condition, and the indication information for enabling an auxiliary uplink TA adjustment function.

* * * * *